US010267265B2

(12) United States Patent
Romet et al.

(10) Patent No.: US 10,267,265 B2
(45) Date of Patent: Apr. 23, 2019

(54) METHOD AND DEVICE FOR MONITORING A PARAMETER OF A ROCKET ENGINE

(71) Applicant: SAFRAN AIRCRAFT ENGINES, Paris (FR)

(72) Inventors: Antoine Romet, Igoville (FR); Serge Le Gonidec, Vernon (FR); Dimitri Malikov, Paris (FR); Jonathan Gazagnes, Vernon (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 30 days.

(21) Appl. No.: 15/301,496

(22) PCT Filed: Apr. 2, 2015

(86) PCT No.: PCT/FR2015/050858
§ 371 (c)(1),
(2) Date: Oct. 3, 2016

(87) PCT Pub. No.: WO2015/150706
PCT Pub. Date: Oct. 8, 2015

(65) Prior Publication Data
US 2017/0175680 A1 Jun. 22, 2017

(30) Foreign Application Priority Data
Apr. 3, 2014 (FR) ...................................... 14 52954

(51) Int. Cl.
F02K 9/00 (2006.01)
F02K 9/56 (2006.01)
(Continued)

(52) U.S. Cl.
CPC .................. F02K 9/96 (2013.01); F02K 9/00 (2013.01); F02K 9/56 (2013.01); G05B 19/048 (2013.01);
(Continued)

(58) Field of Classification Search
CPC ............................ G05B 19/048; G06N 3/0472
(Continued)

(56) References Cited

U.S. PATENT DOCUMENTS

2005/0010389 A1 1/2005 D'Ouince et al.
2005/0222747 A1* 10/2005 Vhora ................ G05B 23/0254
701/100

(Continued)

FOREIGN PATENT DOCUMENTS

EP 1 496 414 A1 1/2005
EP 2 592 253 A1 5/2013
(Continued)

OTHER PUBLICATIONS

International Search Report dated Jul. 14, 2015 in PCT/FR2015/050858 filed Apr. 2, 2015.

*Primary Examiner* — Maceeh Anwari
(74) *Attorney, Agent, or Firm* — Oblon, McClelland, Maier & Neustadt, L.L.P.

(57) ABSTRACT

An obtaining step for obtaining a measurement of the monitored parameter as measured by a sensor and corresponding to an operating point of the engine, the operating point being defined by at least one regulation parameter of the engine; an estimation step for estimating a value of the monitored parameter for this operating point on the basis of a regulated value or a filtered setpoint value of the at least one regulation parameter of the engine defining the operating point; a comparison step for comparing an error between the measurement of the monitored parameter and its estimate relative to at least one threshold determined on the basis of an uncertainty on the error evaluated for the operating point; and a notification step for sending a notification in the event of the at least one threshold being crossed.

10 Claims, 4 Drawing Sheets

(51) Int. Cl.
  *F02K 9/96*    (2006.01)
  *G06N 3/04*    (2006.01)
  *G05B 23/02*   (2006.01)
  *G05B 19/048*  (2006.01)

(52) U.S. Cl.
  CPC ....... *G05B 23/0221* (2013.01); *G06N 3/0472* (2013.01); *F05D 2220/80* (2013.01); *F05D 2260/80* (2013.01); *F05D 2260/81* (2013.01); *F05D 2260/821* (2013.01); *F05D 2270/301* (2013.01); *F05D 2270/303* (2013.01); *F05D 2270/304* (2013.01); *F05D 2270/3061* (2013.01); *F05D 2270/334* (2013.01); *F05D 2270/44* (2013.01); *F05D 2270/709* (2013.01); *G05B 23/0235* (2013.01); *G05B 23/0254* (2013.01); *G05B 2219/24015* (2013.01); *G05B 2219/25255* (2013.01)

(58) Field of Classification Search
  USPC ........................................................ 701/34.4
  See application file for complete search history.

(56) References Cited

U.S. PATENT DOCUMENTS

2013/0138322  A1    5/2013  Genevrier et al.
2013/0247542  A1*   9/2013  Le Gonidec .......... F01D 17/085
                                              60/204
2014/0174054  A1    6/2014  Kernilis et al.

FOREIGN PATENT DOCUMENTS

FR       2 965 305 A1   3/2012
WO     2012/156615 A2  11/2012

* cited by examiner

| MR/CCP | 40-41 | 41-42 | 42-43 | 43-44 | 44-45 | 45-46 | 46-47 | 47-48 | 48-49 | 49-50 | 50-51 | 51-52 | 51-53 |
|---|---|---|---|---|---|---|---|---|---|---|---|---|---|
| 4.8-4.9 | 463 | 462 | 461 | 461 | 460 | 460 | 459 | 459 | 459 | 459 | 459 | 460 | 460 |
| 4.9-5 | 460 | 460 | 460 | 459 | 459 | 459 | 459 | 458 | 458 | 458 | 458 | 458 | 458 |
| 5-5.1 | 458 | 458 | 458 | 458 | 458 | 458 | 458 | 457 | 457 | 457 | 457 | 457 | 457 |
| 5.1-5.2 | 457 | 458 | 458 | 458 | 458 | 458 | 457 | 457 | 457 | 457 | 457 | 457 | 457 |
| 5.2-5.3 | 455 | 457 | 457 | 456 | 456 | 456 | 456 | 456 | 455 | 455 | 455 | 455 | 455 |
| 5.3-5.4 | 453 | 454 | 455 | 455 | 455 | 455 | 454 | 454 | 454 | 454 | 454 | 454 | 453 |
| 5.4-5.5 | 452 | 452 | 452 | 452 | 452 | 452 | 451 | 451 | 451 | 451 | 451 | 451 | 451 |
| 5.5-5.6 | 451 | 451 | 450 | 450 | 450 | 450 | 450 | 450 | 450 | 450 | 450 | 449 | 449 |
| 5.6-5.7 | 449 | 449 | 449 | 449 | 449 | 449 | 449 | 449 | 449 | 448 | 448 | 448 | 448 |
| 5.7-5.8 | 448 | 448 | 448 | 448 | 448 | 448 | 448 | 447 | 447 | 447 | 447 | 447 | 447 |
| 5.8-5.9 | 447 | 447 | 447 | 447 | 447 | 447 | 446 | 446 | 446 | 446 | 446 | 446 | 446 |
| 5.9-6 | 446 | 446 | 446 | 446 | 446 | 445 | 445 | 445 | 445 | 445 | 445 | 445 | 445 |
| 6-6.1 | 445 | 445 | 445 | 445 | 445 | 444 | 444 | 444 | 444 | 444 | 444 | 444 | 444 |
| 6.1-6.2 | 444 | 444 | 444 | 444 | 443 | 443 | 443 | 443 | 443 | 443 | 443 | 443 | 443 |
| 6.2-6.3 | 443 | 443 | 443 | 443 | 442 | 442 | 442 | 442 | 442 | 442 | 442 | 442 | 442 |

METHOD AND DEVICE FOR MONITORING A PARAMETER OF A ROCKET ENGINE

BACKGROUND OF THE INVENTION

The invention relates to the general field of aviation.

More particularly, it relates to monitoring a rocket engine.

In known manner, rocket engine systems need to operate over a wide operating range, and they are provided with means for verifying that they are operating properly.

The verification is performed firstly in real time, making sure that the operating parameters of the engine (e.g. engine temperature and pressure, etc.) remain within predefined acceptable limits, and secondly it is performed in deferred time, by comparing measurements of operating parameters measured during tests on the engine with predetermined straight line monitoring templates, with departure from a template revealing a measurement fault or an engine fault.

The settings for the limits and the monitoring templates are determined manually, and they present a risk of error, in particular when the settings are not appropriate for the operating point of the engine. In addition, a change in the profile or in the test conditions of the engine requires the limits and the monitoring templates to be updated, which is tedious and not without risk.

OBJECT AND SUMMARY OF THE INVENTION

The invention serves to mitigate those drawbacks by proposing a method of monitoring a parameter of a rocket engine, the method comprising:

an obtaining step for obtaining a measurement of the monitored parameter as measured by a sensor and corresponding to an operating point of the engine, the operating point being defined by at least one regulation parameter of the engine;

an estimation step for estimating a value of the monitored parameter for this operating point on the basis of a regulated value or a filtered setpoint value of said at least one regulation parameter of the engine defining the operating point;

a comparison step for comparing an error between the measurement of the monitored parameter and its estimate relative to at least one threshold determined on the basis of an uncertainty on the error evaluated for the operating point; and a notification step for sending a notification in the event of said at least one threshold being crossed.

Correspondingly, the invention also provides a device for monitoring a parameter of a rocket engine, the device comprising:

an obtaining module for obtaining a measurement of the monitored parameter as measured by a sensor and corresponding to an operating point of the engine, the operating point being defined by at least one regulation parameter of the engine;

an estimator module for estimating a value of the monitored parameter for this operating point on the basis of a regulated value or of a filtered setpoint value of said at least one regulation parameter of the engine defining the operating point;

a comparator module for comparing an error between the measurement of the monitored parameter and its estimate relative to at least one threshold that is determined on the basis of an uncertainty on the error evaluated for the operating point; and a notification module for sending a notification in the event of said at least one threshold being crossed.

The error is said to cross the threshold when the error is greater than the threshold if it defines a high threshold that is not to be crossed, or if the error is less than the threshold if the threshold defines a low limit that is not to be crossed.

Furthermore, it should be observed that the error comparison step may be performed in the context of the invention in various ways, in obvious manner to the person skilled in the art. Thus, by way of example, the error may be defined as the absolute value of the difference between the measurement of the monitored parameter and its estimate, or merely as the difference between the measurement of the monitored parameter and its estimate. Furthermore, during this step, the error may be estimated and then compared with the threshold, or in a variant the measurement of the monitored parameter may be compared with its estimate to which the threshold has already been added (or subtracted, where appropriate), etc. This comparison step is equivalent regardless of the way in which the measurement of the monitored parameter is compared with a template defined on the basis of the estimate of the monitored parameter and of the threshold.

The invention also proposes monitoring parameters of a rocket engine in a manner that varies dynamically and automatically with variation in the operating point of the engine. By way of example, the monitored parameter may be a pressure of the engine; and/or a temperature of the engine; and/or a speed of rotation of an element of the engine; and/or a flow rate of a fluid flowing in the engine; and/or a vibratory behavior of the engine.

The operating point of the engine is defined on the basis of one or more parameters used for regulating the engine. Such regulation parameters may for example be a pressure in a combustion chamber of the engine, a ratio of an oxygen/hydrogen mixture at the input of a pump of the engine, a speed of rotation of an oxygen turbopump, a speed of rotation of a hydrogen turbopump, etc. In conventional manner, while the engine is in operation, these regulation parameters are regulated (i.e. controlled) in closed-loop manner by means of a regulation system suitable for acting on various variable-geometry parts of the engine, e.g. such as the positions of regulation valves such as an oxygen bypass valve (OBPV) and a hydrogen bypass valve (HBPV).

The monitoring proposed by the invention advantageously adapts to the dynamic and non-linear nature of rocket engine systems, which nature is associated in particular with the way regulation setpoints for the engine vary as a function of time, these setpoints being bounded in terms of values and gradients by the regulation system. For this purpose, monitoring relies on estimating the monitored parameter(s) (e.g. by simulation or by using models) on the basis of a regulated value (i.e. a validated value for the regulation parameters), so as to limit the uncertainties associated in particular with valves and so as to detect any anomalies affecting only the engine, or a filtered setpoint value for regulation parameters so as to detect any anomalies affecting the entire system downstream from the regulation loop, i.e. affecting not only the engine but also the actuators used for controlling the variable-geometry parts of the engine. The estimate as obtained in this way is then compared with a measurement of the monitored parameter while taking account of a threshold that is determined automatically depending on the operating point of the engine. The threshold is determined in particular on the basis of uncertainties that are encountered at the operating point concerning the measurement and the estimate of the monitored parameter.

Thus, unlike the prior art, the invention does not rely on a pre-established monitoring template or on pre-established limits for comparison with a measurement of the monitored parameter. On the contrary, the invention defines the monitoring template and/or limits for the rocket engine automatically and dynamically on the basis of estimates both of the monitored parameters and of the measurement and estimation accuracy (standard deviation), both evaluated while taking account of the operating point of the engine.

In this particular implementation, the operating point used for evaluating the uncertainty on the error is determined from the regulated value of said at least one regulation parameter.

This implementation relies on an accurate estimate of the operating point. It enables the rocket engine to be monitored both under stable conditions and under transient conditions. Specifically, under transient conditions, it makes it possible to be unaffected by the sometimes non-negligible delays that can be encountered between taking measurements of the regulation parameters and the setpoint values for these parameters during regulation.

In a variant, the operation used for evaluating the uncertainty on the error may be determined from the filtered setpoint value of said at least one regulation parameter or of the setpoint value of said at least one regulation parameter (which is in advance relative to the real operating point of the engine).

It should be observed that a plurality of thresholds may be taken into account during monitoring (e.g. if σ is the uncertainty on the error as a function of the operating point of the engine, then high and low thresholds at +3σ and at +6σ may be taken into consideration), with it being possible for each threshold to be associated with a distinct and appropriate response to the notification that is issued depending on the gravity of the anomaly that has been detected (e.g. issuing a warning, taking maintenance action on the engine, stopping the engine, etc.).

The monitoring thus made possible by the invention thus enables anomalies concerning the rocket engine to be detected both in real time and in deferred time. Consequently, the monitor device may be hosted in the same entity as the device for regulating the engine (e.g. a computer close to the engine), or in a distinct entity, on board the rocket propelled by the engine (e.g. by the flight computer), or indeed in a rocket engine test bench.

In a preferred implementation, the step for estimating the value of the monitored parameter is performed using an artificial neural network having as its input(s) the regulated value or the filtered setpoint value for said at least one regulation parameter of the engine.

Using a neural network makes it easier to reproduce the non-linear behaviors of the rocket engine system, and this applies regardless of the appearance of such non-linear behaviors and regardless of the complexity of the system.

In addition, having recourse to artificial neural networks makes it possible to achieve a compromise between estimation accuracy and computation load, thus enabling the invention to be applied in real time. The amount of calculation needed for estimating the value of the monitored parameter is limited by using such a model.

In this implementation, the uncertainty on the error may take account in particular of an uncertainty in estimating the monitored parameter determined as a function:

of an uncertainty on the input of the neural network; and/or of an uncertainty on the neural network; and/or of an uncertainty on the training database used for constructing the neural network.

In a variant, estimators other than an artificial neural network may be used, e.g. such as a non-linear estimator prepared off-line and based on a non-linear regression, etc.

The inventors have observed that in the presence of sudden variations in the setpoint values for a regulation parameter, the error between the measurement of the monitored parameter and its estimate can come very close to the threshold as determined in accordance with the invention, depending on the operating point. In order to make the monitoring method more robust against this type of phenomenon, it is possible in a particular implementation of the invention also to take account, in the comparison step, of the rate of change of the operating point of the engine, in particular so as to define a template that is wider around the measurement of the monitored parameter in the event of sudden transitions in the operating point of the engine.

By way of example, the template may be defined:
  by an upper bound obtained by multiplying the estimate of the monitored parameter by the step response of a predefined second order filter modeling sudden variations in the setpoint value or the filtered setpoint value or regulation parameters, and by adding the previously determined uncertainty to the result of this operation; and/or
  by a lower bound obtained by multiplying the estimate of the monitored parameter by the step response of a predefined first order filter modeling slow variations in the setpoint value or the filtered setpoint value or the regulation parameters, and subtracting the previously determined uncertainty from the result of this operation.

In other words, in equivalent manner, during the comparison step:
  the error between the measurement of the monitored parameter and its estimate weighted by the response of a predefined second order filter at a step representative of the setpoint value or of the filtered setpoint value of said at least one regulation parameter is compared with a "high" first threshold; and
  the error between the measurement of the monitored parameter and its estimate weighted by the response of a predefined first order filter at said step is compared with a "low" second threshold; one or other of the thresholds being crossed resulting in a threshold crossing notification being sent.

In a particular embodiment, the various steps of the monitoring method are determined by computer program instructions.

Consequently, the invention also provides a computer program on a data medium, the program being suitable for being performed in a monitor device or more generally in a computer or the like, the program including instructions adapted to performing steps of a monitoring method as described above.

The program may use any programming language, and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides a rocket engine including a monitor device of the invention.

In other implementations or embodiments, it is also possible to envisage that the monitoring method, the monitor device, and the rocket engine of the invention present in combination some or all of the above-described characteristics.

Furthermore, it is appropriate to observe that the monitoring method of the invention may be applied to regulated systems other than a rocket engine, such as an airplane engine, for example.

BRIEF DESCRIPTION OF THE DRAWINGS

Other characteristics and advantages of the present invention appear from the following description made with reference to the accompanying drawings, which show implementations having no limiting character. In the figures.

DETAILED DESCRIPTION OF THE INVENTION

Figure 1:
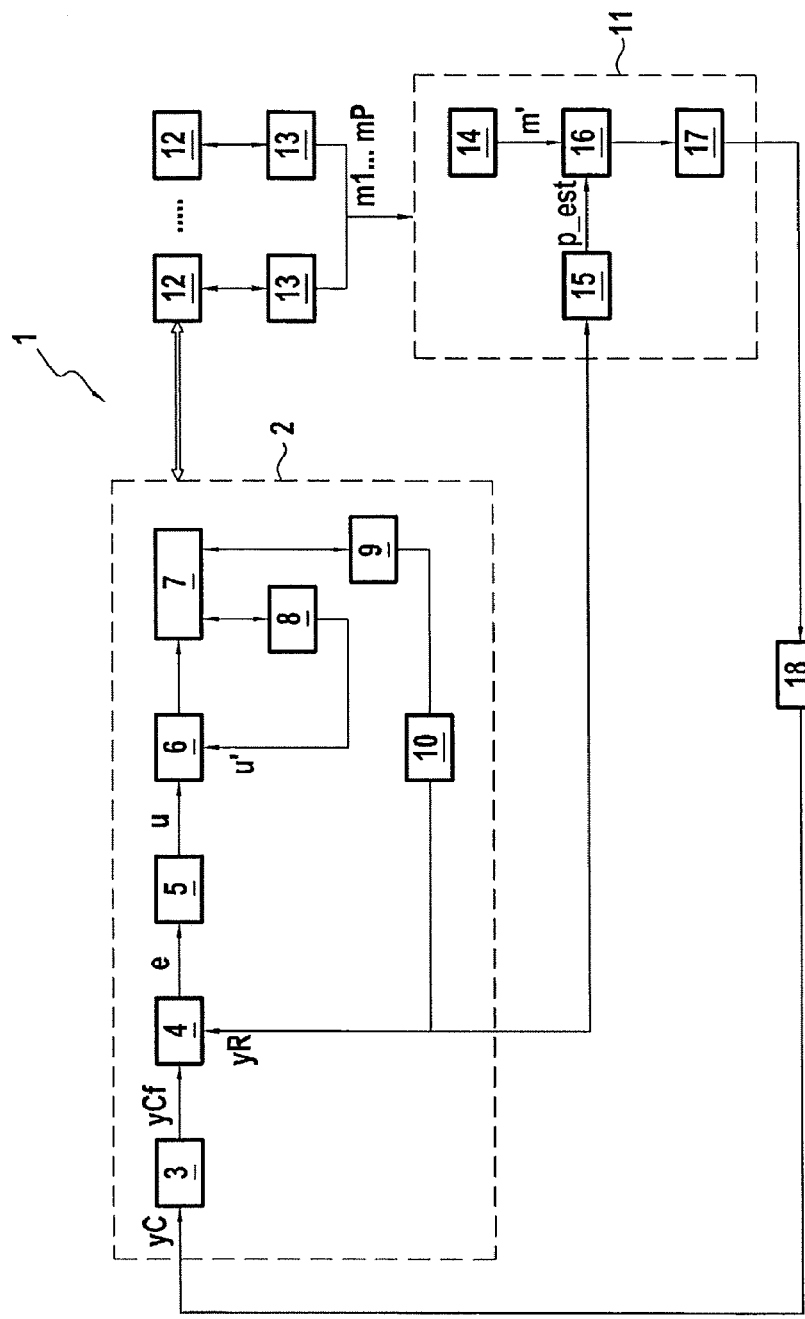
FIG. 1 is a diagram of a rocket engine including a monitor device in accordance with the invention, in a particular embodiment.

FIG. 1 is a diagram showing, in its environment, a particular embodiment of a rocket engine 1 that is to be monitored in accordance with the invention.

In known manner, a rocket engine makes use of liquid hydrogen and oxygen, which are burnt in a combustion chamber while the engine is in operation. In the example under consideration, the delivery of hydrogen and oxygen is controlled by means of regulator valves feeding turbopumps.

The regulator valves serve in particular to control the flow rate of oxygen and hydrogen, the speeds of the turbines, etc. They are controlled by actuators, and their positions are determined by a computer, e.g. the rocket engine computer or controller. For this purpose, the computer relies on various engine regulation parameters, such as for example the pressure in the combustion chamber written CCP, the oxygen/hydrogen ratio of the mixture at the pump inlet, written MRPI, the speeds of rotation of the oxygen and hydrogen turbopumps, etc.

The operating principle of the regulator system 2 as used in this way is shown diagrammatically in FIG. 1. It should be observed that in the example shown in FIG. 1, it is assumed that the regulation logic is performed by the computer of the rocket engine 1. Nevertheless, this assumption is not limiting, and the regulation logic could be performed by some other computer on board the rocket, such as for example the on-board computer (OBC) piloting the rocket.

The regulator system 2 operates in a closed loop. More specifically, a setpoint yC is created by the computer in known manner for each engine regulation parameter, and it is delivered to a tracking dynamic filter 3. The filtered setpoint yCf obtained at the output from the filter 3 is fed to an error calculation module 4, which is also supplied with the regulated value yR of the regulation parameter. The error e as evaluated by the module 4 is supplied to a corrector module 5 of the rocket engine, which evaluates a command u seeking to correct the error e (i.e. to cause to disappear). The command u is a position command for a regulator valve that is used to readjust the value of the regulation parameter so that it matches the setpoint. The command u is transmitted to a corrector module 6 controlling the actuator 7 of the regulator valve as a function of the command u. A position sensor 8 for sensing the position of the regulator valve as controlled in this way returns a measured value u' for the position of the regulator valve to the corrector module 6.

The rocket engine 1 is also provided with a sensor 9 enabling the "regulated" value of the regulation parameter to be measured or estimated on the basis of the position u' of the valve as measured by the sensor 8. By way of example, the sensor 9 is a pressure sensor, a speed sensor, a position sensor, a flow meter, etc., depending on which regulation parameter is under consideration. After being validated by a validation module 10 of the computer (serving in particular to eliminate outlier values), the regulated value is supplied to the error calculation module 4 in order to adapt the command u for the purpose of reaching the setpoint yC, etc. Since the operation of the regulator system 2 is known to the person skilled in the art, it is not described in greater detail herein.

Proper operation of the rocket engine 1 is ensured by a monitor device 11 in accordance with the invention. The monitor device 11 is configured to monitor one or more members or elements 12 of the rocket engine 1 on the basis of measurements m1, . . . , mP supplied by conventional sensors 13 that are suitable for measuring various parameters p1, . . . , pP of the engine at various operating points of the engine, where P is an arbitrary integer greater than or equal to 1. These parameters that are monitored by the monitor device 11 may be for example as follows:

the outlet pressures from the pumps of the engine;
the temperature of the nozzle;
the speeds of rotation of the turbopumps;
the flow rates of the fluids (oxygen, hydrogen) at the inlets of the pumps of the engine;
a vibratory behavior of the engine;
etc.

In order to simplify the description below, consideration is given to only one parameter, written p, which is monitored by the monitor device 11 (i.e. P=1), e.g. the outlet pressure of the oxygen pump of the engine 1, written OPOP (for oxygen pump outlet pressure). Nevertheless, no limit is associated with the number P of engine parameters monitored by the monitor device 11, nor on the natures of these parameters.

Each operating point under consideration of the rocket engine 1 is defined by the value of one or more regulation parameters used by the regulator system 2, as mentioned above. In the presently-envisaged example, each operating point under consideration of the engine is defined by a pair of regulation parameters, namely the pair formed by the value of the combustion chamber pressure CCP and the value of the oxygen/hydrogen mixture ratio at the pump inlets MRPI.

Nevertheless, this assumption is not itself limiting and other regulation parameters, in addition to the above-mentioned regulation parameters or as replacements for them, may be envisaged in order to define the operating point of the rocket engine 1, such as for example the speeds of rotation of the oxygen and hydrogen turbopumps. It is even possible to envisage using only one regulation parameter.

Figure 2:
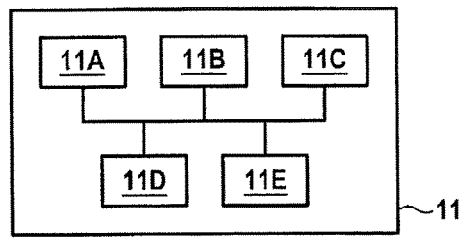
FIG. 2 is a diagram showing the hardware architecture of the FIG. 1 monitor device.

In the presently-described embodiment, the monitor device 11 is incorporated in the rocket engine 1, and more particularly in its computer or controller, thus enabling monitoring to be performed easily in real time while the rocket engine 1 is in flight. It relies on the hardware architecture of a computer, and in the presently-described embodiment, it is as shown diagrammatically in FIG. 2.

Thus, the monitor device 11 comprises in particular a processor 11A, a read only (ROM) memory 11B, a random access memory (RAM) 11C, a non-volatile memory 11D, and communication means 11E for communicating with the various elements of the computer and of the rocket engine 1, and in particular the sensors 13 and the regulator system 2. By way of example, the communication means 11E comprise data buses.

The ROM 11B of the monitor device 11 constitutes a data medium that is readable by the processor 11A and that stores a computer program in accordance with the invention including instructions for executing steps of a monitoring method of the invention, the steps of a particular implementation of the method being as described below with reference to FIGS. 3 to 5.

In equivalent manner, the computer program defines functional modules of the monitor device 11 (specifically software modules) such as an obtaining module 14 for obtaining measurements of the monitored parameters, an estimator module 15 for estimating values of these parameters, a comparator module 16 for comparing the measurements and the estimated values, and a notification module 17 for sending a notification that an activated threshold has been crossed, where appropriate. The functions of these various modules are described in greater detail with reference to the steps of the monitoring method.

In another embodiment, the monitor device 11 is hosted in a rocket engine test bench or in the above-mentioned on-board computer (OBC) of the rocket. No limitation is associated with the entity hosting the monitor device 11. In particular, the regulator system 2 and the monitor device 11 may be hosted by entities that are distinct.

Figure 3:
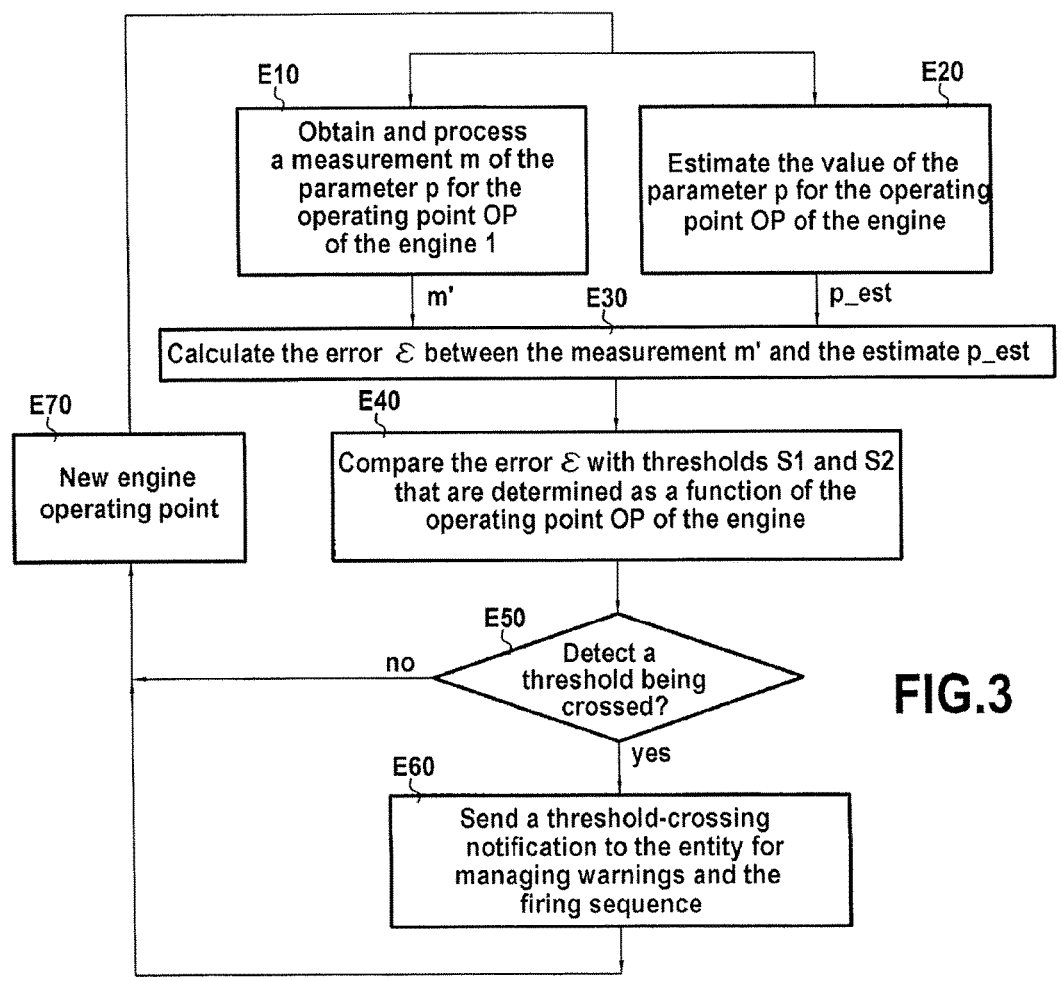
FIG. 3 is a flow chart showing the main steps of a monitoring method of the invention, as performed by the FIG. 1 monitor device.

With reference to FIG. 3, there follows a description of the main steps of the monitoring method performed by the monitor device 11 in a particular implementation of the invention.

As mentioned above, the monitor device 11 monitors the rocket engine 1 on the basis of measurements of the parameter p as collected by one or more sensors 13 of the engine, for various operating points of the engine. Such a measurement m of the parameter p (or more generally m1, . . . , mP of parameters p1, . . . , pP when P parameters are monitored in accordance with the invention) is obtained from the sensor 13 by the obtaining module 14 of the monitor device 11 via the communication means 11E of the monitor device for an operating point OP of the rocket engine 1 (step E10).

In the presently-described implementation, the obtaining module 14 is suitable for processing the measurements received from the sensor 13, and more specifically for filtering them and eliminating any outlier values. Such processing is in conventional use and is not described in greater detail herein. It makes it possible in particular to be unaffected by measurement problems.

The measurement m' of the parameter p resulting from processing the measurement m is stored by the obtaining module 14 in the random access memory 11C of the monitor device 11.

In addition (in parallel with or after step E10), the estimator module 15 of the monitor device 11 estimates the value of the monitor parameter p for the operating point OP (step E20). For this purpose, it uses an estimator constructed from a training database that models the non-linear behavior of the rocket engine 11. The estimator takes as input the value of the operating point OP, and it delivers as output an estimate p_est of the parameter p for that value of the operating point OP. In the presently-described implementation, the operating point input to the estimator is defined by the regulated values yR of the regulation parameters CCP and MRPI.

In another implementation, the operating point OP input to the estimator is defined by the filtered setpoint values yCf of the regulation parameters.

In this implementation, the training database used for constructing the estimator is derived from a mathematical model consolidated with experimental data. Obtaining such a training database does not present any difficulty for the person skilled in the art and it is not described in greater detail herein.

In the presently-described implementation, the estimator used by the estimator module 15 is an artificial neutral network ANN constructed from the training database. This neural network is shown in FIG. 4.

More precisely, in this implementation, the neural network ANN under consideration is a network of the multi-layer perceptron (MLP) type without feedback, having an input layer Lin, an output layer Lout, and one or more successive intermediate layers that are said to be hidden Lhid. For simplification, only one hidden layer is shown in FIG. 4.

The input layer Lin has M+1 inputs (or neurons) forming a vector [Vin, 1], where Vin designates a vector of dimension M comprising the M regulation parameters defining the operating point under consideration of the rocket engine. M is an integer greater than or equal to 1. In the implementation described, the input layer Lin thus comprises, in addition to the unitary input, M=2 inputs that correspond respectively to the pressure CCP of the combustion chamber and the ratio MRPI of the mixture at the inlet of the engine pump.

The output layer Lout of the network has P outputs (or neurons) forming a vector Vout corresponding respectively to the estimates of the P parameters monitored by the monitor device 11. P is an integer greater than or equal to 1. In the presently-described implementation, P=1.

The hidden layer Lhid comprises N neurons, where N is an integer greater than or equal to 1. In this implementation it relies on a sigmoid type function F(x) having a real vector output with N dimensions, defined as follows:

$$F(x) = \frac{2}{1+e^{-2x}} - 1$$

In a variant, other sigmoid type functions may be envisaged.

Thus, the output vector Vout of the neural network is calculated as follows:

$$Vout = W2 \cdot \left[ F\left(W1 \cdot \begin{bmatrix} Vin \\ 1 \end{bmatrix}\right) \right]$$

where W1 is the matrix of synaptic weights between the input layer Lin and the hidden layer Lhid, the last column of this matrix representing the biases of the neurons of the hidden layer, and W2 designates the matrix of synaptic weights between the hidden layer Lhid and the output layer Lout, the last column of this matrix representing the biases of the neurons of the output layer.

The synaptic weights and the biases contained in the matrices W1 and W2 are obtained for the rocket engine 1 by using an automatic training algorithm based on the conjugate gradient method and applied to the training database, as is known to the person skilled in the art and not described herein. In a variant, other known training algorithms could be used in order to construct the neural network ANN from a training database.

Figures 4, 5:
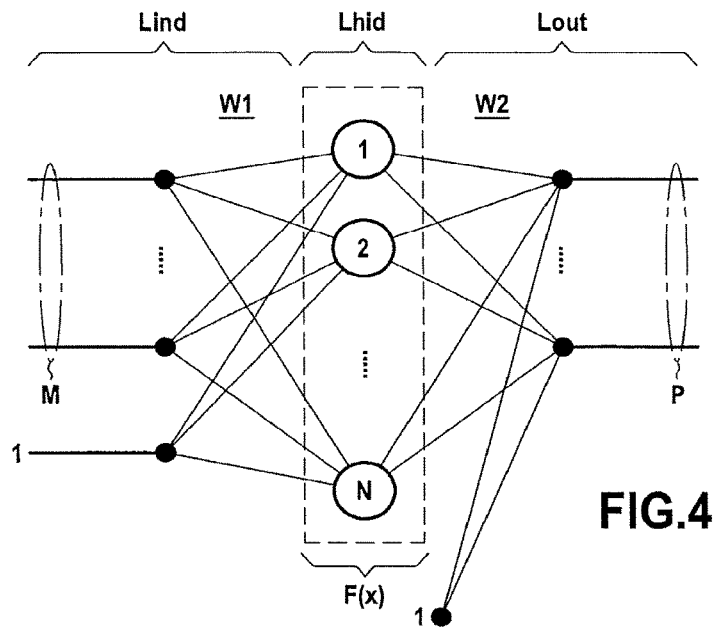
FIG. 4 shows an artificial neural network used by the FIG. 1 monitor device.
FIG. 5 shows an example of a table of values that can be used in the monitoring method shown in FIG. 3.

In the example shown in FIG. 4, only one hidden layer Lhid is shown, having N neurons. The numbers of hidden layers and of neurons per hidden layer can be optimized in order to obtain a network of given accuracy, which accuracy may be measured for example by means of a root mean square error criterion. In a variant, other criteria may also be used, such as for example the calculation time needed to estimate a parameter using the neural network, etc., possibly weighted as a function of their relative importances.

In addition, other neural network architectures may be envisaged, such as for example networks with feedback.

In a variant, non-linear models other than an artificial neural network may be used for estimating the value of the monitored parameter p, such as for example a non-linear model constructed off-line using a non-linear regression defined from structural relationships that exist between the regulation parameters and the monitored parameters. Such structural relationships are themselves known and can be determined experimentally and/or on the basis of the training database.

With reference to FIG. 3, the measurement m' and the estimate p_est of the parameter p are supplied respectively by the obtaining module 14 and by the estimator module 15 to the comparator module 16 of the monitor device 11.

On receiving these values, the comparator module 16 in this implementation begins by evaluating the error ε between the measurement m' and the estimate p_est of the monitored parameter p (step E30) using:

$$\varepsilon = |m' - p\_est|$$

where |m'−p_est| is the absolute value of the difference between the measurement m' and the estimate p_est.

Thereafter it compares the error ε with one or more thresholds S1, ..., SK, where K is an integer greater than or equal to 1 (step E40).

In accordance with the invention, the thresholds S1, ..., SK are determined by the comparator module 16 of the monitor device 11 from an uncertainty σ (i.e. standard deviation) on the error ε as evaluated for the operating point OP under consideration of the rocket engine 1, i.e. for the operating point of the rocket engine 1 at which the measurement m was acquired, and for which the value p_est was estimated. For example, the monitor device 11 considers two distinct thresholds S1=3σ and S2=6σ (or in equivalent manner, if the error taken into consideration is ε=m'−p_est, the thresholds S1=±3σ and S3=±6σ).

These examples are given only by way of illustration, and naturally other multiples of the uncertainty σ may be envisaged as a function of the anomalies that it is desired to detect. The choice of thresholds is guided by the desire to detect any drift in the elements of the rocket engine 1 (including in the sensors that are used) early enough, while limiting false alarms, as described in greater detail below.

In the presently-described implementation, the uncertainty σ takes account of two factors, namely the uncertainty σ1 on the measurement m of the parameter p, and the uncertainty σ2 on the estimate p_est of the parameter p. More precisely:

$$\sigma = \sqrt{(\sigma 1)^2 + (\sigma 2)^2}$$

In a variant, the uncertainty α may be deduced from the uncertainties σ1 and σ2 by using a function other than a root mean square.

The uncertainty σ1 of the measurement m of the parameter p for a given sensor is known. By way of example, it may be extracted or determined from specifications supplied by the manufacturer of the sensor (and possibly validated as a result of tests carried out on the sensor). It should be observed that this uncertainty (or in equivalent manner the measurement accuracy of the sensor) is not necessarily constant over the entire operating range of the rocket engine 1, but may vary as a function of the operating point of the engine. Thus, in order to evaluate the uncertainty σ1, the monitor device 11 in this implementation makes use of a table TAB1 of values predetermined in particular from specifications provided by the manufacturer of the sensor 13, and giving the values of the resulting uncertainty σ1 for different pairs of values (CCP, MRPI) defining operating points OP.

The uncertainty σ2 on the estimate pest of the parameter p in this implementation depends on several sources of uncertainty, including in particular:

the uncertainty (or in equivalent manner, conversely, the accuracy) on the data input to the estimator used by the estimator module 15, and more specifically in this implementation regulated values of the regulation parameters CCP and MRPI. Specifically, the accuracy of the closed loop used by the regulator system 2 depends on the measurement(s) of the regulation parameter(s) as performed by the sensor 9 and on the width of the zone within which the error between the filtered setpoint yCf and the measurement yR is forced to zero in order to avoid non-linear instabilities (limit cycle) in the actuators 7 (associated with their resolution limits);

the uncertainty (or in equivalent manner, conversely, the accuracy) on the estimator used, specifically in this implementation of the artificial neural network ANN, which is not identically zero but depends on the operating point of the engine. The accuracy of the estimator characterizes its ability to reconstruct faithfully the training database from which it is derived; and the uncertainty (or in equivalent manner, conversely, the accuracy) on the training database used for constructing the estimator, i.e. in this implementation the artificial neural network ANN. The estimator may have excellent accuracy and nevertheless the value of the parameter as estimated by the estimator can be remote from the measurement of the parameter if the training database is not reliable, for example when the training database is itself derived from a mathematical model. A bias may then be applied when constructing the estimator in order to take account of the difference between the real engine and the engine as modeled by the training database in order to limit this uncertainty.

In the presently-described implementation, the monitor device 11 evaluates the uncertainty σ2 resulting from the combination of the above-mentioned uncertainties by using a table TAB2 of values as determined, by way of example, by simulation using a conventional Monte Carlo method, known to the person skilled in the art.

FIG. 5 shows an example of such a table of values TAB2. This example is given solely by way of illustration.

For various values of the regulation parameter pair (CCP, MRPI), the table TAB2 gives the resulting uncertainty value σ2 (in the unit of the monitor parameter p, i.e. in the present example in bars, since the monitored parameter is a pressure). In the example shown in FIG. 5, the range of values for the regulation parameters CCP and MRPI has been subdivided arbitrarily into 195 sub-ranges (not all of which are shown for reasons of simplification) in each of which random draws have been carried out in application of the Monte Carlo method. The number of ranges taken into consideration results from a compromise between complexity and uniformity for the value of the uncertainty within a given range.

In a variant, it is possible to envisage that the uncertainty σ2 can be evaluated from an artificial neural network rather than using a table such as the table TAB2.

The comparator module 16 of the monitor device thus extracts the uncertainties σ1 and σ2 corresponding to the operating point OP under consideration of the rocket engine 1 from the above-mentioned tables of values TAB1 and TAB2. For this purpose, it makes use of values for the regulation parameters CCP and MRPI that define the operating point OP, and of the regulated and validated values yR of the regulation parameters CCP and MRPI.

In a variant implementation, in order to extract the uncertainties σ1 and σ2 from the tables TAB1 and TAB2 respectively, the comparator device 16 makes use, as the operating point OP, of the filtered setpoint values yCf for the regulation parameters (i.e. the values as available at the outlet from the tracking dynamic filter 3).

In yet another implementation, in order to extract the uncertainties σ1 and σ2 from the tables TAB1 and TAB2 respectively, the comparator module 16 makes use as, the operating point OP, of the setpoint values yC as set by the regulator sensor 2 for these regulation parameters.

Thereafter, using the uncertainties σ1 and σ2, it evaluates the value of the uncertainty σ. From this value, it deduces the thresholds S1 and S2. By way of example, in this implementation, S1=3σ and S2=6σ.

As mentioned above, the comparator module 16 compares the error ε with the thresholds as determined in this way (step E40).

In a variant, it compares the measurement m' of the monitored parameter p with p_est±3σ and with p_est±6σ.

During this comparison, it determines whether the error ε is greater than the threshold S1 (response "yes" to test step E50 with the threshold S1 being crossed), and the notification module 17 of the monitor device 11 issues a notification that the threshold S1 has been crossed (specifically exceeded, since the error is defined so that that is always positive) for use by an entity 18 for managing warnings and the firing sequence (step E60).

In similar manner, if the comparator module 16 determines that the error ε is greater than the threshold S2 (response "yes" to test step E50 with the threshold S2 being crossed), the notification module 17 of the monitor device 11 issues a notification that the threshold S2 has been crossed for use by an entity 18 for managing warnings and the firing sequence (step E60).

In the presently-described implementation, the entity 18 for managing warnings and the firing sequence makes use, where applicable, of majority logic to determine what action it is appropriate to take on the rocket engine 1 in response to the received threshold crossing notifications. A modular and gradual response as a function of the reported crossing may be implemented (e.g. prepare for maintenance, stop the engine, adapt the setpoint value yC, etc.).

If no threshold is crossed (or exceeded in this implementation), the monitoring continues in compliance with above-described steps E10 to E60 for a new operating point of the rocket engine 1. The same applies after the management entity 18 has been notified.

In the presently-described implementation, the thresholds taken into consideration by the monitor device are set solely as a function of the uncertainty σ (e.g. they are equal to multiples of the uncertainty), which itself depends on the operating point OP under consideration of the rocket engine 1.

In a second implementation of the invention, in order to obtain monitoring of the rocket engine 1 that is more robust, the monitor device 11 determines the thresholds used during the comparison step on the basis of the uncertainty σ and it also takes account of the rate at which the operating point of the engine is changing, and more specifically of (raw or filtered) setpoint values for the regulation parameters.

Figure 6:
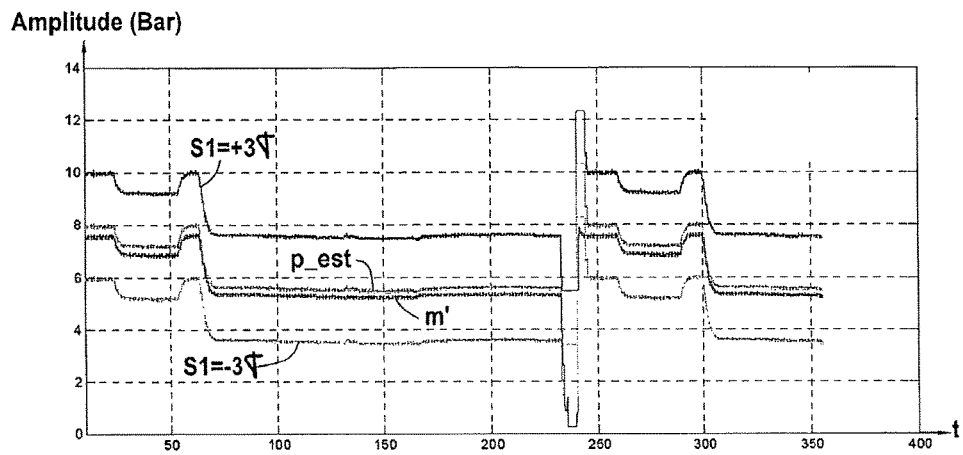
FIG. 6 shows an example of variations in the measurement and the estimate of a pressure OPOP in the system monitored by the FIG. 1 monitor device.

The inventors have observed that when the setpoint values for the regulation parameters as determined by the regulator system 2 change suddenly, the error ε moves very close to the thresholds defined on the basis of the uncertainty σ, as shown in FIG. 6 for the pressure OPOP at the outlet from the oxygen turbopump with a threshold S1=3σ. The risk associated with this transient behavior is that a warning (threshold crossing) is issued erroneously by the monitor device 11 to the entity 18 for managing warnings and the firing sequence.

In order to take account of this phenomenon, during the comparison step, not only does the monitor device 11 use the thresholds determined on the basis of the uncertainty σ and of the operating point OP of the engine, but it also takes account of the rate of change of the engine operating point, and more precisely of the setpoint values for the regulation parameter(s). Taking this into account amounts to defining a wider template for monitoring around the measurement of the monitored parameter in the event of sudden (i.e. fast) transitions of the engine operating point, in contrast a narrower template during slow transitions of the operating point (i.e. when it is changing little or not at all).

In this second implementation, the template is defined by:
an upper bound obtained by multiplying the estimate of the monitored parameter by the step response of a predefined second order filter modeling sudden variations in the setpoint value(s) or the filtered setpoint value(s) for the regulation parameter(s), and by adding the previously determined uncertainty σ (or a multiple of this uncertainty, depending on the threshold under consideration) to the result of this operation; and
a lower bound obtained by multiplying the estimate of the monitored parameter by the step response of a predefined first order filter modeling slow variations in the setpoint value(s) or the filtered setpoint value(s) of the regulation parameter(s), and by subtracting the previously determined uncertainty σ (or a multiple of this uncertainty, depending on the thresholds under consideration) from the result of this operation.

The step taken into consideration for evaluating the step responses of the first and second order filters is defined by the raw setpoint value(s) yC of the regulation parameter(s).

In a variant, the monitor device 11 considers the steps defined by the filtered setpoint value(s) yCf of the regulation parameter(s).

The cutoff frequencies and the delays of the first and second order filters are selected off-line for a given monitored parameter and rocket engine, e.g. experimentally, by calculation, or by testing, on the basis of knowledge about the rate at which the monitored parameter varies as a function of time and of variations in the setpoint values of the regulation parameters.

In a variant, filters of other orders (and in particular higher orders) can be envisaged.

Thus, in this second implementation, the monitor device 11 compares:
the error between the measurement m' of the monitored parameter and its estimate p_est as weighted (i.e. multiplied) by the response of the second order filter at a step representative of the setpoint value yC (or of the filtered setpoint value yCf), with a "high" first threshold that is defined from the uncertainty σ (e.g. S1high=+3σ); and
the error between the measurement m' of the monitored parameter and its estimate p_est as weighted by the response of the first order filter predefined at said step with a "low" second threshold defined from the uncertainty σ (e.g. S1low=−3σ).

Figure 7:
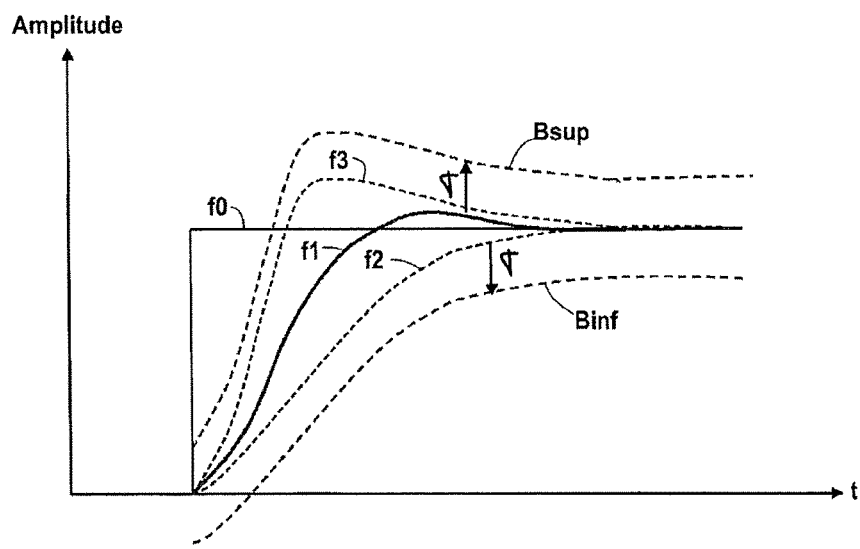
FIG. 7 shows how the thresholds taken into consideration by the monitor device vary as a function of time in a second implementation of the invention.

By way of illustration, FIG. 7 shows the monitoring template that is prepared in this second implementation about the measurement m' to the monitored parameter p.

The rate at which the measurement of the monitored parameter p varies in response to a step f0 representing the raw setpoint value applied to the regulation parameters is shown by curve f1. This rate corresponds to how its amplitude varies as a function of time.

Curve f2 shows the estimate of the monitored parameter p_est as weighted by the output from the first order filter. In similar manner, curve f3 shows the estimate of the monitored parameter p_est weighted by the output of the second order filter.

The low and high bounds Binf and Bsup are obtained respectively by subtracting and by adding the uncertainty σ from or to the curves f2 and f3. These bounds Binf and Bsup define a template for monitoring the measurement m' of the monitored parameter p, with either of these bounds being crossed by the monitored parameter giving rise in accordance with the invention to a notification being issued by the monitor device 11 to the entity 18 for managing warnings and the firing sequence.

It should be observed that these bounds Binf and Bsup vary as a function of time since they vary as a function of the setpoint values for the regulation parameters, in other words the operating point of the engine.

As mentioned above, in the presently-described implementations, the invention is applied to a rocket engine. Nevertheless, the invention may be applied to other regulated systems, such as for example an airplane engine.

The invention claimed is:

1. A method of monitoring a parameter of a rocket engine, the method comprising:
obtaining a measurement of the monitored parameter as measured by a sensor and corresponding to an operating point of the engine, the operating point being defined by at least one regulation parameter of the engine;
estimating a value of the monitored parameter for this operating point on the basis of a regulated value or of a filtered setpoint value of said at least one regulation parameter of the engine defining the operating point;
determining at least one threshold based on an uncertainty on an error evaluated for the operating point, the uncertainty including an uncertainty in estimating the monitored parameter and an uncertainty in measuring the monitored parameter;
comparing an error between the measurement of the monitored parameter and its estimate relative to the at least one threshold; and
sending a notification in the event of said at least one threshold being crossed,
wherein during the comparing, account is also taken of the rate of change of the operating point of the engine, and
wherein during the comparing:
the error between the measurement of the monitored parameter and its estimate weighted by the response of a predefined second order filter at a step representative of the setpoint value or of the filtered setpoint value of said at least one regulation parameter is compared with a "high" first threshold, and
the error between the measurement of the monitored parameter and its estimate weighted by the response of a predefined first order filter at said step is compared with a "low" second threshold.

2. The method according to claim 1, wherein the estimating the value of the monitored parameter is performed using an artificial neural network having as its input the regulated value or the filtered setpoint value for said at least one regulation parameter of the engine.

3. The method according to claim 1, wherein during the comparing, the operating point used for evaluating the uncertainty on the error is determined from:
the regulated value of said at least one regulation parameter; or
the filtered setpoint value of said at least one regulation parameter; or
the setpoint value of said at least one regulation parameter.

4. The method according to claim 1, wherein the operating point is defined by at least one of the following regulation parameters:
a pressure of a combustion chamber of the engine; and
a mixture ratio at the inlet of a pump of the engine.

5. The method according to claim 1, wherein the monitored parameter is a parameter selected from:

a pressure of the engine;

a temperature of the engine;

a speed of rotation of an element of the engine;

a flow rate of a fluid flowing in the engine; and a vibratory behavior of the engine.

6. The method according to claim 1, wherein the uncertainty on the error takes account at least of an uncertainty selected from an uncertainty in estimating the monitored parameter and an uncertainty in measuring the monitored parameter.

7. The method according to claim 2, wherein the uncertainty on the error takes account of an uncertainty in estimating the monitored parameter, which uncertainty is determined as a function:

of an uncertainty on the input of the artificial neural network;

of an uncertainty on the neural network;

of an uncertainty on the training database used for constructing the neural network.

8. A non-transitory computer readable medium including instructions for executing steps, when executed on a computer, comprising:

obtaining a measurement of the monitored parameter as measured by a sensor and corresponding to an operating point of the engine, the operating point being defined by at least one regulation parameter of the engine;

estimating a value of the monitored parameter for this operating point on the basis of a regulated value or of a filtered setpoint value of said at least one regulation parameter of the engine defining the operating point;

determining at least one threshold based on an uncertainty on an error evaluated for the operating point, the uncertainty including an uncertainty in estimating the monitored parameter and an uncertainty in measuring the monitored parameter;

comparing an error between the measurement of the monitored parameter and its estimate relative to the at least one threshold; and sending a notification in the event of said at least one threshold being crossed, wherein during the comparing, account is also taken of the rate of change of the operating point of the engine, and wherein during the comparing:

the error between the measurement of the monitored parameter and its estimate weighted by the response of a predefined second order filter at a step representative of the setpoint value or of the filtered setpoint value of said at least one regulation parameter is compared with a "high" first threshold, and the error between the measurement of the monitored parameter and its estimate weighted by the response of a predefined first order filter at said step is compared with a "low" second threshold.

9. A device for monitoring a parameter of a rocket engine, the device comprising:

an obtaining module for obtaining a measurement of the monitored parameter as measured by a sensor and corresponding to an operating point of the engine, the operating point being defined by at least one regulation parameter of the engine;

an estimator module for estimating a value of the monitored parameter for this operating point on the basis of a regulated value or of a filtered setpoint value of said at least one regulation parameter of the engine defining the operating point;

a determining module for determining at least one threshold based on an uncertainty on the error evaluated for the operating point, the uncertainty including an uncertainty in estimating the monitored parameter and an uncertainty in measuring the monitored parameter;

a comparator module for comparing an error between the measurement of the monitored parameter and its estimate relative to the at least one threshold; and a notification module for sending a notification in the event of said at least one threshold being crossed, wherein the comparator module also takes into account the rate of change of the operating point of the engine, and wherein the comparator module:

compares the error between the measurement of the monitored parameter and its estimate weighted by the response of a predefined second order filter at a step representative of the setpoint value or of the filtered setpoint value of said at least one regulation parameter with a "high" first threshold, and compares the error between the measurement of the monitored parameter and its estimate weighted by the response of a predefined first order filter at said step with a "low" second threshold.

10. A rocket engine comprising:

a device for monitoring a parameter of a rocket engine, the device comprising:

an obtaining module for obtaining a measurement of the monitored parameter as measured by a sensor and corresponding to an operating point of the engine, the operating point being defined by at least one regulation parameter of the engine;

an estimator module for estimating a value of the monitored parameter for this operating point on the basis of a regulated value or of a filtered setpoint value of said at least one regulation parameter of the engine defining the operating point;

a determining module for determining at least one threshold based on an uncertainty on the error evaluated for the operating point, the uncertainty including an uncertainty in estimating the monitored parameter and an uncertainty in measuring the monitored parameter;

a comparator module for comparing an error between the measurement of the monitored parameter and its estimate relative to the at least one threshold; and a notification module for sending a notification in the event of said at least one threshold being crossed, wherein the comparator module also takes into account the rate of change of the operating point of the engine, and wherein the comparator module:

compares the error between the measurement of the monitored parameter and its estimate weighted by the response of a predefined second order filter at a step representative of the setpoint value or of the filtered setpoint value of said at least one regulation parameter with a "high" first threshold, and compares the error between the measurement of the monitored parameter and its estimate weighted by the response of a predefined first order filter at said step with a "low" second threshold.

* * * * *